United States Patent
Martinez et al.

(10) Patent No.: US 11,724,364 B2
(45) Date of Patent: Aug. 15, 2023

(54) ABRASIVE ARTICLE AND METHOD OF GRINDING

(71) Applicant: 3M INNOVATIVE PROPERTIES COMPANY, St. Paul, MN (US)

(72) Inventors: Jaime A. Martinez, Woodbury, MN (US); Jing Zhang, Minneapolis, MN (US); Geoffrey I. Wilson, Woodbury, MN (US); Stacy A. Sommer, Hudson, WI (US); Louis S. Moren, Oakdale, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/467,156

(22) PCT Filed: Dec. 4, 2017

(86) PCT No.: PCT/US2017/064469
§ 371 (c)(1),
(2) Date: Jun. 6, 2019

(87) PCT Pub. No.: WO2018/106583
PCT Pub. Date: Jun. 14, 2018

(65) Prior Publication Data
US 2020/0070315 A1 Mar. 5, 2020

Related U.S. Application Data

(60) Provisional application No. 62/432,122, filed on Dec. 9, 2016.

(51) Int. Cl.
*B24D 11/02* (2006.01)
*B24D 3/00* (2006.01)
(Continued)

(52) U.S. Cl.
CPC .............. *B24D 11/02* (2013.01); *B24D 3/004* (2013.01); *B24D 3/28* (2013.01); *B24D 3/344* (2013.01); *C09K 3/1409* (2013.01)

(58) Field of Classification Search
CPC ........ B24D 18/00; B24D 3/28; B24D 11/001; B24D 11/00; B24D 11/02; B24D 3/004;
(Continued)

(56) References Cited

U.S. PATENT DOCUMENTS 3,926,585 A * 12/1975 Lukowski .............. B24D 3/346
51/295
4,314,827 A 2/1982 Leitheiser et al.
(Continued)

FOREIGN PATENT DOCUMENTS

EP  0486308  5/1992
WO  WO 2015/038401  3/2015

OTHER PUBLICATIONS

Sigma Aldrich, Safety Data Sheet (SDS) for Hoechst Wax C (Jun. 4, 2021) (Year: 2021).*
(Continued)

*Primary Examiner* — Bryan D. Ripa
*Assistant Examiner* — Ross J Christie
(74) *Attorney, Agent, or Firm* — Tingting Tu

(57) ABSTRACT

An abrasive article includes a backing, abrasive particles secured to the backing, and a size coat provided over the abrasive particles, the size coat comprises a binder resin, at least one filler material and at least one lubricant material having a melting temperature of at least about 200 degrees F. A method of grinding aluminum using such an abrasive article is also described.

11 Claims, 1 Drawing Sheet

(51) Int. Cl.
 *B24D 3/28* (2006.01)
 *B24D 3/34* (2006.01)
 *C09K 3/14* (2006.01)

(58) Field of Classification Search
 CPC ... B24D 5/12; B24D 7/02; B24D 5/02; B24D 3/344; C09K 3/1436; C09K 3/14
 See application file for complete search history.

(56) References Cited

U.S. PATENT DOCUMENTS

| | | | |
|---|---|---|---|
| 4,623,364 A | 11/1986 | Cottringer et al. | |
| 4,652,275 A | 3/1987 | Bloecher et al. | |
| 4,744,802 A | 5/1988 | Schwabel | |
| 4,770,671 A | 9/1988 | Monroe et al. | |
| 4,799,939 A | 1/1989 | Bloecher et al. | |
| 4,848,041 A | 7/1989 | Kruschke | |
| 4,881,951 A | 11/1989 | Wood et al. | |
| 5,152,917 A | 10/1992 | Pieper et al. | |
| 5,201,916 A | 4/1993 | Berg et al. | |
| 5,213,591 A | 5/1993 | Celikkaya et al. | |
| 5,346,516 A | 9/1994 | Alkhas et al. | |
| 5,435,816 A | 7/1995 | Spurgeon et al. | |
| 5,672,097 A | 9/1997 | Hoopman | |
| 5,704,952 A | 1/1998 | Law et al. | |
| 5,833,724 A | 11/1998 | Wei et al. | |
| 5,908,477 A * | 6/1999 | Harmer | B24D 3/004 451/59 |
| 5,946,991 A | 9/1999 | Hoopman | |
| 5,975,987 A | 11/1999 | Hoopman et al. | |
| 6,129,540 A | 10/2000 | Hoopman et al. | |
| 6,451,076 B1 | 9/2002 | Nevoret et al. | |
| 6,843,815 B1 | 1/2005 | Thurber et al. | |
| 8,034,137 B2 | 10/2011 | Erickson et al. | |
| 8,142,531 B2 | 3/2012 | Adefris et al. | |
| 8,142,532 B2 | 3/2012 | Erickson et al. | |
| 8,142,891 B2 | 3/2012 | Culler et al. | |
| 8,511,577 B2 | 8/2013 | Warren et al. | |
| 2002/0026752 A1 * | 3/2002 | Culler | B24D 3/28 51/298 |
| 2002/0037683 A1 | 3/2002 | Goers et al. | |
| 2009/0165394 A1 | 7/2009 | Culler et al. | |
| 2009/0169816 A1 | 7/2009 | Erickson et al. | |
| 2012/0227333 A1 | 9/2012 | Adefris et al. | |
| 2013/0012112 A1 * | 1/2013 | Hsu | D04H 1/43835 451/532 |
| 2013/0040537 A1 | 2/2013 | Schwabel et al. | |
| 2013/0125477 A1 | 5/2013 | Adefris | |

OTHER PUBLICATIONS

KBM Affilips. "Exploring the Role of Potassium Aluminum Fluoride in Abrasive Products" (Jun. 1, 2017) Azom.com (pp. 1-7) (Year: 2017).*
Beijing Dongke United Technologies Co., Ltd. "What is the difference between Fischer-Tropsch wax and paraffin wax" (Year: 2020).*
Micro Powders, Inc. "MP-28C" (Year: 2022).*
International Search Report for PCT International Application No. PCT/US2017/064469, dated Feb. 13, 2018, 4 pages.
Anonymous: Microcrystalline wax | chemical compound | Britannica, Jan. 15, 2010, Retrieved from the Internet: URL: https://www.britannica.com/science/microcrystalline-wax [retrieved on Jun. 9, 2020] 9 pgs.
Lan Wang et al., Polymeric Materials and Engineering Series Textbooks, China Light Industry Press, Jan. 2009, pp. 345-346.

* cited by examiner

ABRASIVE ARTICLE AND METHOD OF GRINDING

CROSS REFERENCE TO RELATED APPLICATIONS

This application is a national stage filing under 35 U.S.C. 371 of PCT/US2017/064469, filed Dec. 4, 2017, which claims the benefit of U.S. Provisional Application No. 62/432,122, filed Dec. 9, 2016, the disclosures of which are incorporated by reference in their entireties herein.

BACKGROUND

The present invention relates generally to abrasive articles that are useful for abrading, finishing and/or grinding a wide variety of materials and surfaces. More particularly, the present invention relates to an abrasive article and to a method of grinding a workpiece using such an abrasive article.

Abrasive articles having an antiloading composition are known in the prior art. U.S. Pat. No. 5,908,477 (Harmer et al.), for example, discloses an abrasive article that includes a bond system formed from a binder precursor and about 15% by weight or less of a wax-containing modifier. An abrasive article that includes the bond system exhibits an increase of workpiece surface abraded in a Woodsanding Normal Force Test as compared to an abrasive article including a bond system formed from a composition containing substantially no wax-containing modifier.

PCT Publication WO2015/038401 (Moren et al.) discloses a nonwoven abrasive article including a lofty open nonwoven fiber web, an abrasive layer bonded to the lofty open nonwoven fiber web, and a peripheral antiloading composition disposed on the abrasive layer. The peripheral antiloading composition comprises at least 50 percent by weight of wax having a melting point onset of from 180° F. (82° C.) to 290° F. (143° C.). A method of abrading a workpiece using the nonwoven abrasive article is also disclosed.

SUMMARY

Many abrasive articles have an abrading surface that generates heat and/or wears rapidly when used at high speeds and/or under high pressures. The heating of the abrading surface may cause the binding resin of the abrasive article to weaken which may, in turn, cause abrasive particles to release prematurely from the binding resin. The release of abrasive particles can reduce the life and cut rate of the abrasive article. In addition, heat generated during abrading may heat the surface of the workpiece. The heating of the workpiece surface may cause the workpiece surface to soften or melt such that material from the workpiece loads up on the abrading surface of the abrasive article, thereby interfering with the optimum use and performance of the abrasive article.

In order to reduce friction and thereby reduce the amount of heat generated during an abrading operation, an operator may periodically apply a lubricant to either the abrading surface of the abrasive article or to the surface of the workpiece being abraded. Doing so, however, requires an additional manual step on the part of the operator and may result in inconsistent results depending on how much lubricant is applied and how often the lubricant is applied. In addition, applying a lubricant in a separate step requires the lubricant to be purchased separately at an additional expense.

Another technique for improving the grinding performance of a coated abrasive article involves reducing loading by applying a stearate supersize coating to the abrasive article. However, adding such a supersize coating is costly and, to achieve optimal performance, the supersize coating must be tailored to the specific end-use application.

There continues to be a need for improving the cost, performance and/or life of abrasive articles. It would be desirable to provide an abrasive article with improved cut, longer life, reduced loading, and lower cost compared with conventional abrasive articles and abrading techniques.

In one embodiment, the present invention provides an abrasive article comprising a backing, abrasive particles secured to the backing, and a size coat provided over the abrasive particles. The size coat comprises a binder resin, at least one filler material and at least one lubricant material having a melting temperature of at least about 200 degrees Fahrenheit (° F.) (93.3 degrees Celsius—° C.). In one embodiment the abrasive article includes a make coat layer bonding the abrasive particles to the backing. In another embodiment, the abrasive particles may be bonded directly to the backing.

In specific aspects for certain embodiments, the size coat may comprise at least about 10 wt % and no greater than about 80 wt % binder resin, the size coat may comprise at least about 1 wt % and no greater than about 75 wt % filler material and the size coat may comprise at least about 1 wt % weight and no greater than about 30 wt % lubricant material.

In one embodiment, the abrasive article may be a coated abrasive article such as, for example, a coated abrasive belt, a coated abrasive fiber disc or a coated nonwoven abrasive article.

The abrasive articles according to the present disclosure may include a backing layer formed of cloth, paper, polymeric film, fibrous nonwoven, and combinations thereof. In addition, the abrasive articles may include abrasive particles formed of alumina, silicon carbide or diamond, the filler material may comprise cryolite or potassium aluminum fluoride (PAF), the filler material may comprise one material or a blend of at least two different filler materials, the binder resin may comprise phenolic resin and/or an epoxy resin, the lubricant material may comprise wax, the lubricant material may comprise synthetic paraffin wax, the synthetic paraffin wax lubricant may comprise a solid powder at room temperature, the synthetic paraffin wax lubricant may comprise a powder having an average particle size of at least about 1 micron and no greater than about 50 microns, and/or the wt % ratio of phenolic resin to (cryolite+synthetic paraffin wax) may be at least about 1:4 and no greater than about 4:1.

In another aspect, the present invention provides a method of grinding aluminum. The method of grinding aluminum comprises the steps of providing an abrasive article according to any of the embodiments described herein and bringing the moving abrasive article into contact with the aluminum.

In a specific embodiment, the abrasive article is a coated abrasive article consisting of a backing having first and second opposed major surfaces, a make coat resin provided on the backing layer first major surface, a plurality of abrasive particles at least partially embedded in the make coat resin, a size coat provided over the make coat layer and abrasive particles, wherein the size coat comprises at least about 10 wt % phenolic resin and no greater than about 90 wt % phenolic resin, at least about 1 wt % filler and no greater than about 75 wt % filler material and at least about 1 wt % synthetic paraffin wax and no greater than about 30 wt % synthetic paraffin wax, wherein the filler material comprises at least one of cryolite and potassium aluminum fluoride (PAF), and wherein the synthetic paraffin wax is a solid at room temperature, has a melting temperature of at least about 210 degrees F., and comprises a powder having an average particle size of at least about 6 microns and no greater than about 13 microns.

As used herein, "coated abrasive article" refers to an article with the abrasive material coated on the outer surface of the article (i.e. the abrasive material is not included within the backing).

Advantages of certain embodiments described herein include that it is easy to make and use, provides consistent results, is cost effective, and that it improves performance (e.g. reduces friction and heat generation, reduces loading, minimizes shelling, extends life and improves cut).

DETAILED DESCRIPTION

Figure 1:
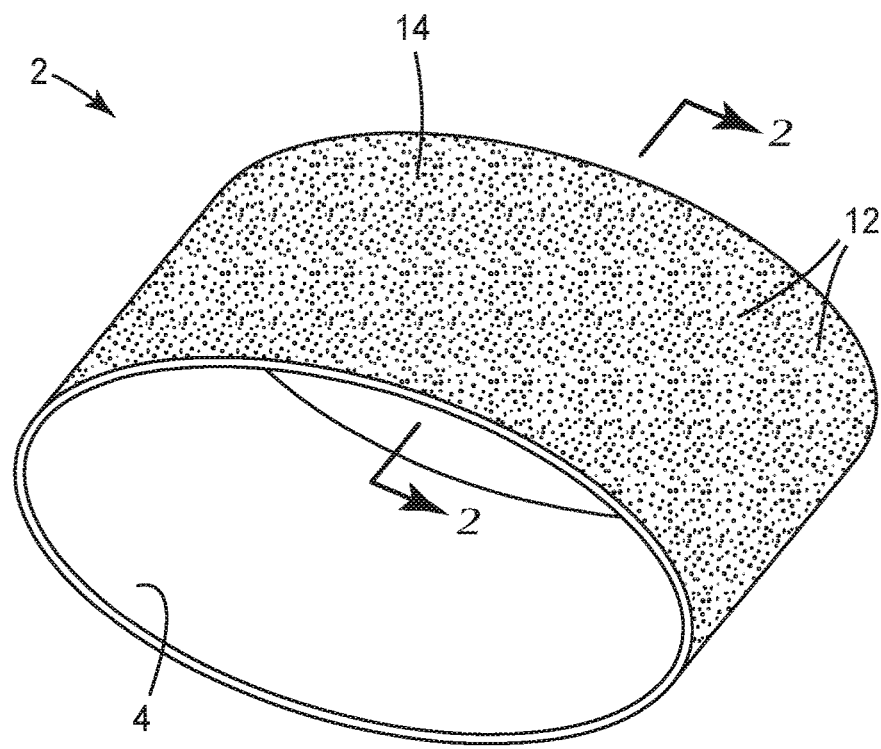
FIG. 1 is a perspective view of an abrasive article according to an embodiment of the invention.
Figure 2:
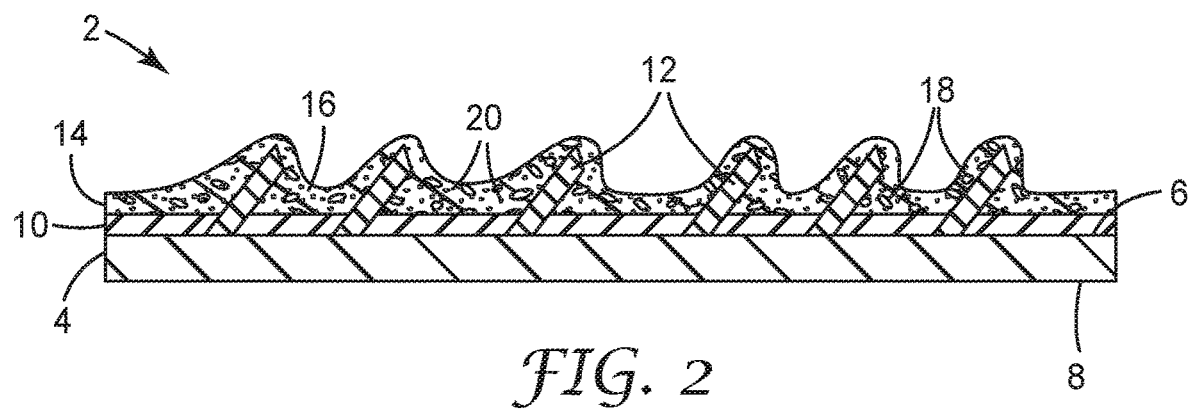
FIG. 2 is a cross sectional view taken along line 2-2 of FIG. 1.

Referring now to the drawings, FIGS. 1 and 2 show an abrasive article 2 in the form of a coated abrasive belt in which two free ends of a sheet-like abrasive article are joined together using known methods to form an endless spliced belt. It will be recognized that abrasive articles according to the present disclosure are not limited to belts and may be converted into, for example, discs (including perforated discs), sheets and/or pads. Throughout the description and the accompanying figures, functionally similar features are referred to with like reference numerals.

The abrasive article 2 generally comprises a backing or substrate 4 having a first major surface 6 and a second opposed major surface 8, an optional make coat 10, a plurality of abrasive particles 12 arranged on the first major surface 6 at least partially embedded in the make coat 10, and a size coat 14 arranged over the make coat and the abrasive particles 12. The abrasive particles 12 may be bonded to the backing 4 using a make coat 10 as shown, or the abrasive particles 12 may be affixed directly to the backing according to known techniques. In accordance with one aspect of the present disclosure, the size coat 14 includes a binder resin 16, a lubricant material 18 and a filler material 20. That is, a lubricant material 18 and filler material 20 are incorporated into the size coat 14 along with the binder resin 16. The lubricant material 18 and filler material 20 are selected to reduce the amount of friction between the abrasive article 2 and the surface of the workpiece being abraded, thereby reducing the amount of heat generated. This provides a number of potential benefits including, for example, reduced loading, longer life and improved cut. In addition, the lubricant material 18 and filler material 20 provide improved cut and longer life in a controlled, predictable and cost effective manner.

The particular backing or substrate 4 is not critical to the invention hereof, so long as it provides the desired function and properties for the particular abrasive article and its intended end-use application. In some embodiments, the backing may include a treatment such as a backsize layer (i.e., a coating on the major surface of the backing opposite the major surface having the abrasive layer), a presize layer, a tie layer (i.e., a coating between the abrasive layer and the major surface to which the abrasive layer is secured), and/or a saturant. Conventional backing treatments used in coated abrasive constructions include resole phenolic resins, phenolic/latex blends, urea-formaldehyde, and melamine formaldehyde resins.

Suitable materials for the backing 4 according to the present disclosure include, for example, cloth, paper, polymeric films and fibrous nonwoven materials. More specifically, examples of suitable backing materials include polymeric films, primed polymeric films, cloths, paper, vulcanized fiber, densified nonwovens, foam (e.g. sponge material or polyurethane foam), treated versions of these, and combinations thereof. The backing 4 may comprise optional additives such as, for example, fillers, antistatic agents, wetting agents, surfactants, pigments, dyes, coupling agents, plasticizers, and suspending agents. The amounts of these optional materials depend on the properties desired. Generally, the backing material is selected such that it has sufficient strength and heat resistance to withstand its process and use conditions.

Suitable resins for the optional make coat 10 include a wide variety of known resins such as, for example, thermosetting resins, phenolic resins, epoxy resins, urea-formaldehyde resins, acrylate resins, cyanate resins, aminoplast resins, melamine resins, acrylated epoxy resins, urethane resins and combinations thereof.

Suitable resins for the size coat 14 include a wide variety of known resins including the make coat resins listed above, namely, thermosetting resins, phenolic resins, epoxy resins, urea-formaldehyde resins, acrylate resins, cyanate resins, aminoplast resins, melamine resins, acrylated epoxy resins, urethane resins and combinations thereof.

In the illustrated embodiment, the size coat 14 includes a binder resin 16, a lubricant material 18 and a filler material 20. In accordance with one aspect of the present disclosure, it has been found that by incorporating certain amounts of certain ingredients into the size coat 14, the abrading performance of the abrasive article 2 can be enhanced. In one embodiment, it was found that the life and cut of a coated abrasive article was surprisingly and significantly improved by incorporating at least one filler material and at least one lubricant material into the size coat 14.

More specifically, it was found that adding a lubricant having a melting temperature of at least about 200 degrees Fahrenheit (° F.) (93.3° C.) or at least about 210° F. (98.9° C.) produced particularly desirable results. In one embodiment, the lubricant is solid powder at room temperature (i.e. at 77° F., 25° C.). In one embodiment, the lubricant may comprise, for example, a wax. Suitable waxes include natural and synthetic waxes. More specifically, the lubricant may be a synthetic paraffin wax. In another aspect, the wax is a powder having a maximum particle size of no greater than about 22 microns. In another aspect, the wax is a powder having an average particle size of at least about 1 micron, at least about 3 microns or at least about 6 microns, and having an average particle size of no greater than about 50 microns, no greater than about 25 microns, or no greater than about 13 microns. Suitable waxes include MP-28C, MPP-635G and MP-22VF available from Micro Powders Inc. Terrytown, N.Y. MP-22VF is a micronized synthetic paraffin wax having a melting point ranging from about 215° F. to about 223° F. (101.7° C. to about 106.1° C.). MP-22VF is a fine powder that allows it to be readily dispersed in the size coat resin.

As indicated above, the size coat 14 generally comprises a binder resin 16, at least one lubricant material 18 and at least one filler material 20. The amounts of each of these three ingredients may vary within ranges. In one embodiment, the size coat 14 comprises at least about 10 wt % and no greater than about 80 wt % binder resin. In another embodiment, the size coat comprises at least about 1 wt % and no greater than about 75 wt % filler material. And in another embodiment, the size coat comprises at least about 1 wt % weight and no greater than about 30 wt % lubricant material.

Filler materials are generally inexpensive materials that reduce the raw material cost of the abrasive article while maintaining efficiency and cut rate. It has been found that, depending on the particular intended end-use application for the abrasive article, the particular filler material used in the size coat 14 may impact the overall abrading performance of the abrasive article 2 when used in combination with certain resin binders and certain lubricants. Suitable filler materials include, for example, potassium calcium sulfate, calcium carbonate, calcium silicate, pyrite/iron sulfide, quartz, natural or synthetic cryolite ($Na_3AlF_6$), and potassium aluminum fluoride (PAF). For certain end-use applications, potassium aluminum fluoride (PAF) was found to produce particularly desirable results. The size coat 14 may include one filler material, or a blend of two or more different filler materials.

In accordance with a specific aspect of the present disclosure, the wt % ratio of binder resin in the size coat to the combined wt % of filler material and lubricant material in the size coat is at least about 1:4 and no greater than about 4:1. That is, the binder resin may comprise at least about 20 wt % of the size coat to no greater than about 80 wt % of the size coat. In a specific embodiment, the binder resin is a phenolic resin, the lubricant is a synthetic paraffin wax and the filler is PAF, and the weight percent ratio of phenolic resin to (PAF+wax) is from 1:4 to about 4:1.

The make coat and/or size coat may further comprise additives that are known in the art, such as, for example, additional fillers, grinding aids, wetting agents, surfactants, dyes, pigments, coupling agents, adhesion promoters, and combinations thereof.

In a coated abrasive, the make coat 10 and size coat 14 may collectively be referred to as a binder, and they may be made from the same or different binder precursors. During manufacture of a coated abrasive article, a binder precursor is exposed to an energy source which aids in the initiation of the polymerization or curing of the binder precursor. Examples of energy sources include thermal energy and radiation energy (e.g., electron beam, ultraviolet light, and visible light). During this polymerization process, the binder precursor is polymerized or cured and is converted into a solidified binder.

The binder can be formed of a curable (e.g., via energy such as UV light or heat) organic material. Examples of curable organic binder materials include amino resins, alkylated urea-formaldehyde resins, melamine-formaldehyde resins, and alkylated benzoguanamine-formaldehyde resin, acrylate resins (including acrylates and methacrylates) such as vinyl acrylates, acrylated epoxies, acrylated urethanes, acrylated polyesters, acrylated acrylics, acrylated polyethers, vinyl ethers, acrylated oils, and acrylated silicones, alkyd resins such as urethane alkyd resins, polyester resins, reactive urethane resins, phenolic resins such as resole and novolac resins, phenolic/latex resins, epoxy resins such as bisphenol epoxy resins, isocyanates, isocyanurates, polysiloxane resins (including alkylalkoxysilane resins), reactive vinyl resins, and phenolic resins (resole and novolac). The resins may be provided as monomers, oligomers, polymers, or combinations thereof.

The binder precursor can be a condensation curable resin, an addition polymerizable resin, a free-radical curable resin, and/or combinations and blends of such resins. One binder precursor is a resin or resin mixture that polymerizes via a free-radical mechanism. The polymerization process is initiated by exposing the binder precursor, along with an appropriate catalyst, to an energy source such as thermal energy or radiation energy. Examples of radiation energy include electron beam, ultraviolet light, or visible light.

Examples of suitable binder precursors include phenolic resins, urea-formaldehyde resins, aminoplast resins, urethane resins, melamine formaldehyde resins, cyanate resins, isocyanurate resins, (meth)acrylate resins (e.g., (meth)acrylated urethanes, (meth)acrylated epoxies, ethylenically-unsaturated free-radically polymerizable compounds, aminoplast derivatives having pendant alpha, beta-unsaturated carbonyl groups, isocyanurate derivatives having at least one pendant acrylate group, and isocyanate derivatives having at least one pendant acrylate group) vinyl ethers, epoxy resins, and mixtures and combinations thereof. As used herein, the term "(meth)acryl" encompasses acryl and methacryl. Ethylenically-unsaturated monomers or oligomers, or (meth)acrylate monomers or oligomers, may be monofunctional, difunctional, trifunctional or tetrafunctional, or even higher functionality.

A wide variety of abrasive particles may be utilized in the various embodiments described herein. The particular type of abrasive particle 12 (e.g. size, shape, chemical composition) is not considered to be particularly significant to the abrasive article 2, so long as at least a portion of the abrasive particles 12 are suitable for the intended end-use application. Suitable abrasive particles may be formed of, for example, cubic boron nitride, zirconia, alumina, silicon carbide and diamond.

The abrasive particles 12 may be provided in a variety of sizes, shapes and profiles, including, for example, random or crushed shapes, regular (e.g. symmetric) profiles such as square, star-shaped or hexagonal profiles, and irregular (e.g. asymmetric) profiles.

The abrasive article 2 may include a mixture of abrasive particles that are inclined on the backing (i.e. stand upright and extend outwardly from the backing) as well as abrasive particles that lie flat on their side (i.e. they do not stand upright and extend outwardly from the backing).

The abrasive article 2 may include a mixture of different types of abrasive particles. For example, the abrasive article 2 may include mixtures of platey and non-platey particles, crushed and shaped particles (which may be discrete abrasive particles that do not contain a binder or agglomerate abrasive particles that contain a binder), conventional non-shaped and non-platey abrasive particles (e.g. filler material) and abrasive particles of different sizes.

Examples of suitable shaped abrasive particles can be found in, for example, U.S. Pat. No. 5,201,916 (Berg) and U.S. Pat. No. 8,142,531 (Adefris et al.) A material from which the shaped abrasive particles 12 may be formed comprises alpha alumina. Alpha alumina shaped abrasive particles can be made from a dispersion of aluminum oxide monohydrate that is gelled, molded to shape, dried to retain the shape, calcined, and sintered according to techniques known in the art.

U.S. Pat. No. 8,034,137 (Erickson et al.) describes alumina crushed abrasive particles that have been formed in a specific shape, then crushed to form shards that retain a portion of their original shape features. In some embodiments, shaped alpha alumina particles are precisely-shaped (i.e., the particles have shapes that are at least partially determined by the shapes of cavities in a production tool used to make them). Details concerning such shaped abrasive particles and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U.S. Pat. Appl. Publ. Nos. 2012/0227333 (Adefris et al.); 2013/0040537 (Schwabel et al.); and 2013/0125477 (Adefris).

Examples of suitable crushed abrasive particles include crushed abrasive particles comprising fused aluminum oxide, heat-treated aluminum oxide, white fused aluminum oxide, ceramic aluminum oxide materials such as those commercially available as 3M CERAMIC ABRASIVE GRAIN from 3M Company, St. Paul, Minn., brown aluminum oxide, blue aluminum oxide, silicon carbide (including green silicon carbide), titanium diboride, boron carbide, tungsten carbide, garnet, titanium carbide, diamond, cubic boron nitride, garnet, fused alumina zirconia, iron oxide, chromia, zirconia, titania, tin oxide, quartz, feldspar, flint, emery, sol-gel-derived ceramic (e.g., alpha alumina), and combinations thereof. Further examples include crushed abrasive composites of abrasive particles (which may be platey or not) in a binder matrix, such as those described in U.S. Pat. No. 5,152,917 (Pieper et al.).

Examples of sol-gel-derived abrasive particles from which crushed abrasive particles can be isolated, and methods for their preparation can be found in U.S. Pat. No. 4,314,827 (Leitheiser et al.); U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). It is also contemplated that the crushed abrasive particles could comprise abrasive agglomerates such as, for example, those described in U.S. Pat. No. 4,652,275 (Bloecher et al.) or U.S. Pat. No. 4,799,939 (Bloecher et al.).

The crushed abrasive particles comprise ceramic crushed abrasive particles such as, for example, sol-gel-derived polycrystalline alpha alumina particles. Ceramic crushed abrasive particles composed of crystallites of alpha alumina, magnesium alumina spinel, and a rare earth hexagonal aluminate may be prepared using sol-gel precursor alpha alumina particles according to methods described in, for example, U.S. Pat. No. 5,213,591 (Celikkaya et al.) and U.S. Publ. Pat. Appln. Nos. 2009/0165394 A1 (Culler et al.) and 2009/0169816 A1 (Erickson et al.).

Further details concerning methods of making sol-gel-derived abrasive particles can be found in, for example, U.S. Pat. No. 4,314,827 (Leitheiser); U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.); and in U.S. Patent Publication No. 2009/0165394 A1 (Culler et al.). Examples of suitable platey crushed abrasive particles can be found in, for example, U.S. Pat. No. 4,848,041 (Kruschke).

The abrasive particles may be surface-treated with a coupling agent (e.g., an organosilane coupling agent) or other physical treatment (e.g., iron oxide or titanium oxide) to enhance adhesion of the crushed abrasive particles to the binder.

The abrasive articles described herein find particular application in the grinding of aluminum. That is, certain embodiments include a combination of properties that make them particularly suited to efficiently grind aluminum. A general method of using the abrasive articles described herein to grind aluminum includes the steps of providing an abrasive article with the features described herein and bringing the moving abrasive article into contact with the aluminum.

Persons of ordinary skill in the art may appreciate that various changes and modifications may be made to the invention described above without deviating from the inventive concept. For example, nonwoven abrasive constructions and bonded abrasive constructions are also contemplated. More specifically, it will be recognized that in addition to coated abrasives, features of the present disclosure may find application in nonwoven abrasive articles in which a nonwoven backing layer is coated with an optional make coat, abrasive particles, and a size coat including a lubricant and filler material as described herein. Features of the present invention may also find application in bonded abrasive constructions such as cut off wheels, depressed center grinding wheels, and grinding wheels of various sizes and constructions. In such bonded abrasive constructions, a lubricant and filler material as described herein may be incorporated into the bonding material (e.g. ceramic materials, vitreous materials, resinous materials and epoxies). Thus, the scope of the present invention should not be limited to the constructions described in this application, but only by the constructions described by the language of the claims and the equivalents of those constructions.

In order that the invention described herein can be more fully understood, the following examples are set forth. It should be understood that these examples are for illustrative purposes only, and are not to be construed as limiting this invention in any manner.

EXAMPLES

Unless otherwise noted, all parts, percentages, ratios, etc. in the Examples and the rest of the specification are by volume. Unless stated otherwise, all other reagents were obtained, or are available from chemical vendors such as Sigma-Aldrich Company, St. Louis, Mo., or may be synthesized by known methods.

Abbreviations for materials and reagents used in the examples are listed in Table 1.

TABLE 1

| ABBREVIATION | DESCRIPTION |
| --- | --- |
| PF1 | Phenol-formaldehyde resin having a phenol to formaldehyde weight ratio of 1.5-2.1:1, and catalyzed with 2.5 percent potassium hydroxide. |
| BACK1 | Polyester backing, according to the description disclosed in Example 12 in U.S. Pat. No. 6,843,815 (Thurber et al.). |
| FIL1 | Calcium carbonate obtained under trade designation "Q325" from Huber Engineered Materials, Atlanta, Georgia. |
| FIL2 | Calcium Silicate obtained under trade designation "M400 |

TABLE 1-continued

| ABBREVIATION | DESCRIPTION |
|---|---|
| | WOLLASTOCOAT" from NYCO, Willsboro, New York. |
| FIL3 | Cryolite obtained under the trade designation "CRYOLITE RTN-C" from FREEBEE A/S, Ullerslev, Denmark. |
| FIL4 | Potassium aluminum fluoride obtained under the trade designation "KALFREN PAF" from Washington Mills, Niagra Falls, New York. |
| WAX1 | A micronized synthetic wax obtained under the trade designation "MP-22VF" from Micropowders Inc., Tarrytown, New York. |
| WAX2 | A micronized synthetic wax obtained under the trade designation "MP-28C" from Micropowders Inc., Tarrytown, New York. |
| RIO | Red iron oxide pigment, obtained under the trade designation "KROMA RO-3097" from Elementis, East Saint Louis, Illinois. |
| MIN1 | Shaped abrasive particles were prepared according to the disclosure of U.S. Pat. No. 8,142,531(Adefris et al.). The shaped abrasive particles were prepared by molding alumina sol gel in equilateral triangle-shaped polypropylene mold cavities of side length 0.110 inch (2.8 mm) and a mold depth of 0.028 inch (0.71 mm). The fired shaped abrasive particles were about 1.37 mm (side length) × 0.027 mm thick and would pass through an ASTM 45 (Tyler equivalent 42)-mesh sieve. |
| MIN2 | ANSI grade 40 aluminum oxide abrasive mineral, obtained under the trade designation "DURALUM G52 BROWN ALUMINUM OXIDE GRADE 40" from Washington Mills Electro Minerals Corporation, Niagara Falls, New York. |

Make Coat Adhesive Composition 1

The make coat adhesive composition was prepared by charging a 4 liter plastic container with 1521 grams of PF1, 1236 grams of FIL2, mechanically mixing and then diluting to a total weight of 3 kilograms with water.

Example 1

BACK1 was coated with Make Coat Adhesive Composition 1 at a coating weight of 180.0 grams per square meter (g/m$^2$) using a roll coating method. Abrasive particles MIN1 and MIN2 were then applied to the make resin-coated backing at a 1:1 ratio by weight using the electrostatic deposition process according to the method disclosed in U.S. Pat. No. 8,511,577 (Moren et al.). The total coating weight of both MIN1 and MIN2 was 549.3 g/m$^2$. The abrasive coating roll was then placed in an oven at 65.6° C. for 15 minutes followed by 90 minutes at 98.9° C. A size coat of 69.9 parts PF1, 7.0 parts FIL3, 13.3 parts WAX1, 1.4 part RIO and 8.4 parts water was then applied to the make resin and mineral coated backing at a coating weight of 481.3 g/m$^2$. The coated backing roll was then placed in the oven at 175° F. (79.4° C.) for 20 min followed by 65 minutes at 210° F. (98.9° C.). The backing material was then wound into a roll and placed in an oven for forced air cure for 12 hours at 102.8° C.

Example 2

BACK1 was coated with Make Coat Adhesive Composition 1 at a coating weight of 180.0 g/m$^2$ using a roll coating method. Abrasive particle MIN1 and MIN2 were then applied to the make resin-coated backing at a 1:1 ratio by weight using the electrostatic deposition process as described in EXAMPLE 1. The total coating weight of both MIN1 and MIN2 was 549.3 g/m$^2$. The abrasive coating roll was then placed in an oven at 65.6° C. for 15 minutes followed by 90 minutes at 98.9° C. A size coat of 52.1 parts PF1, 35.4 parts FIL3, 5.2 parts WAX1, 1.0 part RIO and 6.3 parts water was then applied to the make resin and mineral coated backing at a coating weight of 481.3 g/m$^2$. The coated backing roll was then placed in the oven at 175° F. (79.4° C.) for 20 min followed by 65 minutes at 210° F. (98.9° C.). The backing material was then wound into a roll and placed in an oven for forced air cure for 12 hours at 102.8° C.

Example 3

BACK1 was coated with Make Coat Adhesive Composition 1 at a coating weight of 180.0 g/m$^2$ using a roll coating method. Abrasive particle MIN1 and MIN2 were then applied to the make resin-coated backing at a 1:1 ratio by weight using the electrostatic deposition process as described in EXAMPLE 1. The total coating weight of both MIN1 and MIN2 was 549.3 g/m$^2$. The abrasive coating roll was then placed in an oven at 65.6° C. for 15 minutes followed by 90 minutes at 98.9° C. A size coat of 52.1 parts PF1, 35.4 parts FIL4, 5.2 parts WAX2, 1.0 parts RIO and 6.3 parts water was then applied to the make resin and mineral coated backing at a coating weight of 481.3 g/m$^2$. The coated backing roll was then placed in the oven at 175° F. (79.4° C.) for 20 min followed by 65 minutes at 210° F. (98.9° C.). The backing material was then wound into a roll and placed in an oven for forced air cure for 12 hours at 102.8° C.

Comparative Example A

BACK1 was coated with Make Coat Adhesive Composition 1 at a coating weight of 180.0 g/m$^2$ using a roll coating method. Abrasive particle MIN1 and MIN2 were then applied to the make resin-coated backing at a 1:1 ratio by weight using the electrostatic deposition process as described in EXAMPLE 1. The total coating weight of both MIN1 and MIN2 was 549.3 g/m$^2$. The abrasive coating roll was then placed in an oven at 65.6° C. for 15 minutes followed by 90 minutes at 98.9° C. A size coat of 52.4 parts PF1, 40.3 parts FIL3, 1.0 part RIO and 6.3 parts water was then applied to the make resin and mineral coated backing at a coating weight of 481.3 g/m$^2$. The coated backing roll was then placed in the oven at 175° F. (79.4° C.) for 20 min followed by 65 minutes at 210° F. (98.9° C.). The backing material was then wound into a roll and placed in an oven for forced air cure for 12 hours at 102.8° C.

Comparative Example B

COMPARATIVE EXAMPLE B was a coated belt obtained under trade designation 984F 36+ CUBITRON™ II METALWORKING BELT from 3M Company, Saint Paul, Minn.

Grinding Test

The grinding test was conducted on a 10.16 centimeters (cm)×91.44 cm belt converted from coated abrasive samples obtained from EXAMPLES 1 to 3 and COMPARATIVE EXAMPLES A and B. The workpiece was a 6061 aluminum bar on which the surface to be abraded measured 1.9 cm by 1.9 cm. A 20.3 cm diameter 70 durometer rubber, 1:1 land to groove ratio, serrated contact wheel was used. The belt was run at 2750 revolutions per minute. The workpiece was applied to the center part of the belt at a normal force 4.4 kilograms. The test consisted of measuring the weight loss of the workpiece after 15 seconds of grinding. The workpiece was then cooled and tested again. The test was concluded after 25 cycles. The total cut in grams was defined as the total weight loss of the workpiece after 25 cycles. The results are listed in TABLE 2.

TABLE 2

Grinding Test Results

| Sample | Total Cut in Grams |
| --- | --- |
| COMPARATIVE EXAMPLE A | 70.5 |
| COMPARATIVE EXAMPLE B | 167.8 |
| EXAMPLE 1 | 133.6 |
| EXAMPLE 2 | 194.7 |
| EXAMPLE 3 | 228.2 |

What is claimed is:

1. An abrasive article comprising:
a backing;
abrasive particles secured to the backing; and
a size coat provided over the abrasive particles;
wherein the size coat comprises a binder resin, at least one filler material and at least one lubricant material having a melting temperature of at least about 200 degrees F.;
wherein:
the lubricant material comprises a Fischer-Tropsch wax that is a solid powder at room temperature, the solid powder having an average particle size of at least 1 micron and no greater than 50 microns;
the binder resin comprises a phenolic resin; and
the filler material comprises potassium aluminum fluoride (PAF);
wherein the wt % ratio of phenolic resin to the combination of the filler material and the lubricant material is at least 1:4 and no greater than 4:1.

2. An abrasive article as defined in claim 1, further comprising a make coat layer bonding the abrasive particles to the backing.

3. An abrasive article as defined in claim 1, wherein the size coat comprises at least about 10 wt % and no greater than about 80 wt % binder resin.

4. An abrasive article as defined in claim 3, wherein the size coat comprises at least about 1 wt % filler material and no greater than about 75 wt % filler material.

5. An abrasive article as defined in claim 4, wherein the size coat comprises at least about 1 wt % lubricant material and no greater than about 30 wt % lubricant material.

6. An abrasive article as defined in claim 1, wherein the abrasive article is a coated abrasive article.

7. An abrasive article as defined in claim 1, wherein the abrasive article is at least one of a belt, fiber disc, and a nonwoven abrasive article.

8. An abrasive article as defined in claim 1, wherein the abrasive particles are at least one of alumina, silicon carbide and diamond.

9. An abrasive article as defined in claim 1, wherein the filler material comprises a blend of at least two different filler materials.

10. An abrasive article as defined in claim 1, wherein the binder resin further comprises epoxy.

11. A method of grinding aluminum, comprising the steps of providing an abrasive article as defined in claim 1 and bringing the moving abrasive article into contact with the aluminum.

* * * * *